(12) United States Patent
Yoshioka (10) Patent No.: US 6,827,481 B2
(45) Date of Patent: Dec. 7, 2004

(54) PARTITIONING DEVICE FOR MIXER (75) Inventor: Hisao Yoshioka, Kawaguchi (JP)

(73) Assignee: Aicohsha Mfg. Co., Ltd., Warabi (JP)

(*) Notice: Subject to any disclaimer, the term of this patent is extended or adjusted under 35 U.S.C. 154(b) by 0 days.

(21) Appl. No.: 10/399,833
(22) PCT Filed: Aug. 28, 2001
(86) PCT No.: PCT/JP01/07352
§ 371 (c)(1), (2), (4) Date: Apr. 21, 2003
(87) PCT Pub. No.: WO02/092210
PCT Pub. Date: Nov. 21, 2002

(65) Prior Publication Data
US 2004/0022124 A1 Feb. 5, 2004

(30) Foreign Application Priority Data
May 16, 2001 (JP) ......................... 2001-146904

(51) Int. Cl.$^7$ ................... B01F 13/04; B01F 7/16; A47J 43/07; A47J 43/44
(52) U.S. Cl. ..................................... 366/347
(58) Field of Search ................... 366/347, 197, 366/199

(56) References Cited

U.S. PATENT DOCUMENTS

| 2,014,734 | A | * | 9/1935 | Hoe ....................... 366/197 |
| 3,875,423 | A | * | 4/1975 | Kemper .................... 366/142 |
| 4,900,160 | A | * | 2/1990 | Brooks et al. .............. 366/347 |
| 4,968,149 | A | * | 11/1990 | Loiselet et al. ............ 366/189 |
| 5,306,083 | A | * | 4/1994 | Caldwell et al. ........... 366/347 |
| 5,348,393 | A | * | 9/1994 | Pappas, Jr. ................. 366/347 |
| 5,533,806 | A | * | 7/1996 | Veltrop et al. ............. 366/347 |
| 6,068,398 | A | * | 5/2000 | Lin ........................... 366/347 |

FOREIGN PATENT DOCUMENTS

| JP | 08 257385 | 10/1996 |
| JP | 2001 038186 | 2/2001 |

* cited by examiner

Primary Examiner—Tony G. Soohoo
(74) Attorney, Agent, or Firm—W. F. Fasse; W. G. Fasse (57) ABSTRACT A partitioning device is provided on a mixer wherein a bowl is held on the front side of the pillar of the machine body, and a mixing tool is rotated in the bowl by a mixing shaft which extends downward from a head protruding forward from the upper part of the pillar. The partitioning device includes a partitioning member, which has an annular rail and a surface member, a fixed roller(s) and a movable roller(s), which fit with the rail of the partitioning member, a fixed roller supporting means, which supports the fixed roller so that the fixed roller is prevented from shifting in relation to the machine body, and a movable roller supporting means, which supports the movable roller so that the distance between the movable roller and the fixed roller can be varied, and biases the movable roller in a direction to move toward the fixed roller.

4 Claims, 10 Drawing Sheets

PARTITIONING DEVICE FOR MIXER

TECHNICAL FIELD

The present invention belongs to the field of mixers for mixing materials such as food and chemicals, and in particular, relates to a partitioning device which protects hands of operators by preventing such hands from entering into the bowl in which a material is being mixed and prevents the material from scattering.

BACKGROUND ART

The present inventor proposed a partitioning device for mixer of this kind, which was disclosed in Japanese patent unexamined publication gazette 2001-38186. The partitioning device is designed for a mixer wherein a bowl is supported on the front side of a pillar of the machine body, and a mixing tool is rotated in the bowl by a mixing shaft which extends downward from a head protruding forward from the upper part of the pillar. The partitioning device comprises an annular guide ring which is arranged to surround the mixing shaft beneath the head, a protective fence which is formed into a tube having a local opening and extends from the guide ring toward the circumference of the bowl, and a guide rail which is mounted on the machine body to surround the outer circumference of the guide ring and rotatably support rollers being fitted with the guide ring. When the protective fence is located to cover the upper part of the front of the bowl, hands of operators will be prevented from entering into the rotation area of the mixing tool. When the protective fence is moved revolutionarily so that its opening comes to the upper part of the front of the bowl, the operators will be able to feed materials, visually check the materials in the bowl, and fix or unfix the mixing tool. The guide rail is divided into two parts, a right one and a left one, and they are disconnectably fitted together. With this division, the partitioning device can be put on or taken away from the machine body. With this arrangement, the protective fence can be washed whole, and the interior of the machine body can be cleaned easily, and in turn, the sanitary conditions of the mixer can be maintained satisfactorily.

To disconnectably fit the guide rail, which is divided into two parts, the right portion and the left portion, onto this mixer, the mixer is provided with fitting means such as buckles. When the protective fence is to be disconnected from the machine body, if the fitting means are undone, the protective fence will drop off the guide rail. Hence it is necessary to hold the protective fence by one hand and undo the fitting means by the other hand. This will exceedingly reduce the efficiency of the operation. To cope with this, one idea may be to provide the machine body with a leaf spring at a point which comes below the guide ring of the protective fence to receive the falling protective fence once by this leaf spring. Then the operator can pull the protective fence downwards by exerting a force which exceeds the elastic force of the leaf spring to retract and disconnect the protective fence from the machine body. In this way the operator can disconnect the protective fence from the machine body by holding the protective fence with both hands. In this case, however, when the protective fence is to be installed on the machine body, the operator will need to flex the leaf spring in the reverse direction. This, in turn, will require a knack in fitting the protective fence on the machine body and pose a problem of reduced efficiency of operation.

As mixers are produced according to varied sets of specifications and protective fences which are applicable to these mixers vary in size, varied guide rails must be provided according to the kinds of the protective fences. This is a cost-raising factor.

If the guide ring of the protective fence is not formed to be a true circle due to, for example, dispersion in manufacture, the gap between the guide ring and the roller is not constant along the circumference and will pose a problem of irregular revolutionary movement of the protective fence and, in turn, difficulty in its use.

DISCLOSURE OF INVENTION

The present invention was made in view of these points, and its objective is to provide a partitioning device for mixer, wherein a partitioning member such as a protective fence is held by movable rollers, and with this arrangement, the partitioning member can be removed from or installed on the machine body of the mixer by holding the partitioning member by both hands, and a plurality of kinds of partitioning members can be used commonly, and dispersions in the configuration of individual partitioning members are absorbed to ensure their smooth revolutionary movement.

To accomplish the above-mentioned objective, the partitioning device for mixer according to the present invention is a partitioning device which is provided on a mixer wherein a bowl is held on the front side of the pillar of the machine body, and a mixing tool is rotated in the bowl by a mixing shaft which extends downward from a head protruding forward from the upper part of the pillar, the partitioning device is characterized in that it comprises a partitioning member, which has an annular rail being arranged beneath the head to surround the mixing shaft and a surface member having a local opening and being formed into a tube to extend from the rail toward the circumference of the bowl, a total of at least three rollers being a combination of fixed roller and movable roller, which fit with the rail of the partitioning member from the inside or the outside to support the partitioning member movably around the mixing shaft, a fixed roller supporting means, which rotatably supports the fixed roller in such a way that the fixed roller is prevented from shifting in relation to the machine body, and a movable roller supporting means, which supports the movable roller in such a way that the movable roller can rotate and the distance between the movable roller and the fixed roller can be varied, and energizes the movable roller in a direction to close to the fixed roller.

In the case of this partitioning device for mixer, the partitioning member is made to move by rotating the fixed roller and the movable roller which fit with the rail thereof. When the partitioning member is positioned to cover the upper part of the front of the bowl, hands of the operator will be prevented from entering into the rotation area of the mixing tool, and the materials will be prevented from being scattered. Moreover, when the partitioning member is positioned in such a way that its opening comes to the upper part of the front of the bowl, the operator will be able to feed a material, visually check the material in the bowl and fix or unfix a mixing tool.

When the partitioning member is to be removed from the machine body, the operator will hold the partitioning member by hands and push the partitioning member to press the movable roller in a direction against its energizing force. Then the rail of the partitioning member will come off the fixed roller. When the operator lowers the released rail portion to shift the partitioning member downward aslant away from the fixed roller, the partitioning member will be removed from the machine body. When the partitioning member is to be fitted on the machine body, the operator will hold the partitioning member by hands in such a way that the movable roller side of the partitioning member is raised a little higher than the other side, and the operator will fit the rail of the partitioning member with the movable roller and push the movable roller in a direction against its energizing force, then make the partitioning member level and allow the partitioning member to move in the direction of the energizing force of the movable roller so that the rail of the partitioning member fits with the fixed roller. As a result, the partitioning member will be fitted on the machine. The above-mentioned operation can be done easily by holding the partitioning member with both hands. When the partitioning member is removed from the machine body, the partitioning member can be washed whole, and the interior of the machine body can be cleaned with ease, and the sanitary conditions of the mixer can be maintained satisfactorily.

As the movable roller is held in such a way that the distance between the movable roller and the fixed roller can be varied, and is energized in a direction to close to the fixed roller, a plurality of partitioning members of varied rail diameters can be supported between the fixed roller and the movable roller, and the cost can be reduced through the use of common parts for various mixers. Moreover, even if the rail of a partitioning member is out of a true circle, the movable roller will shift to vary the distance between the movable roller and the fixed roller. Hence the fixed roller and the movable roller can fit with the rail stably and the partitioning member can make smooth revolutionary movement.

As described above, the partitioning device for mixer according to the present invention can ensure the safety of the operators, prevent the materials from scattering, and provide convenience of feeding materials or the like, by means of the partitioning member, and can maintain the sanitary conditions of the mixer satisfactorily by allowing the partitioning member to be fitted on or removed from the machine body. Moreover, as the partitioning member can be removed from or fitted on the machine body by holding it with both hands, the efficiency of fitting or removing the partitioning member can be enhanced significantly. Furthermore, as a plurality of different kinds of partitioning members can be used in common, the cost can be reduced. As the dispersion or tolerance in the configuration of rails of partitioning members can be compensated or absorbed, smooth revolutionary movement of the partitioning members can be assured.

BEST MODE FOR CARRYING OUT THE INVENTION

Figure 1:
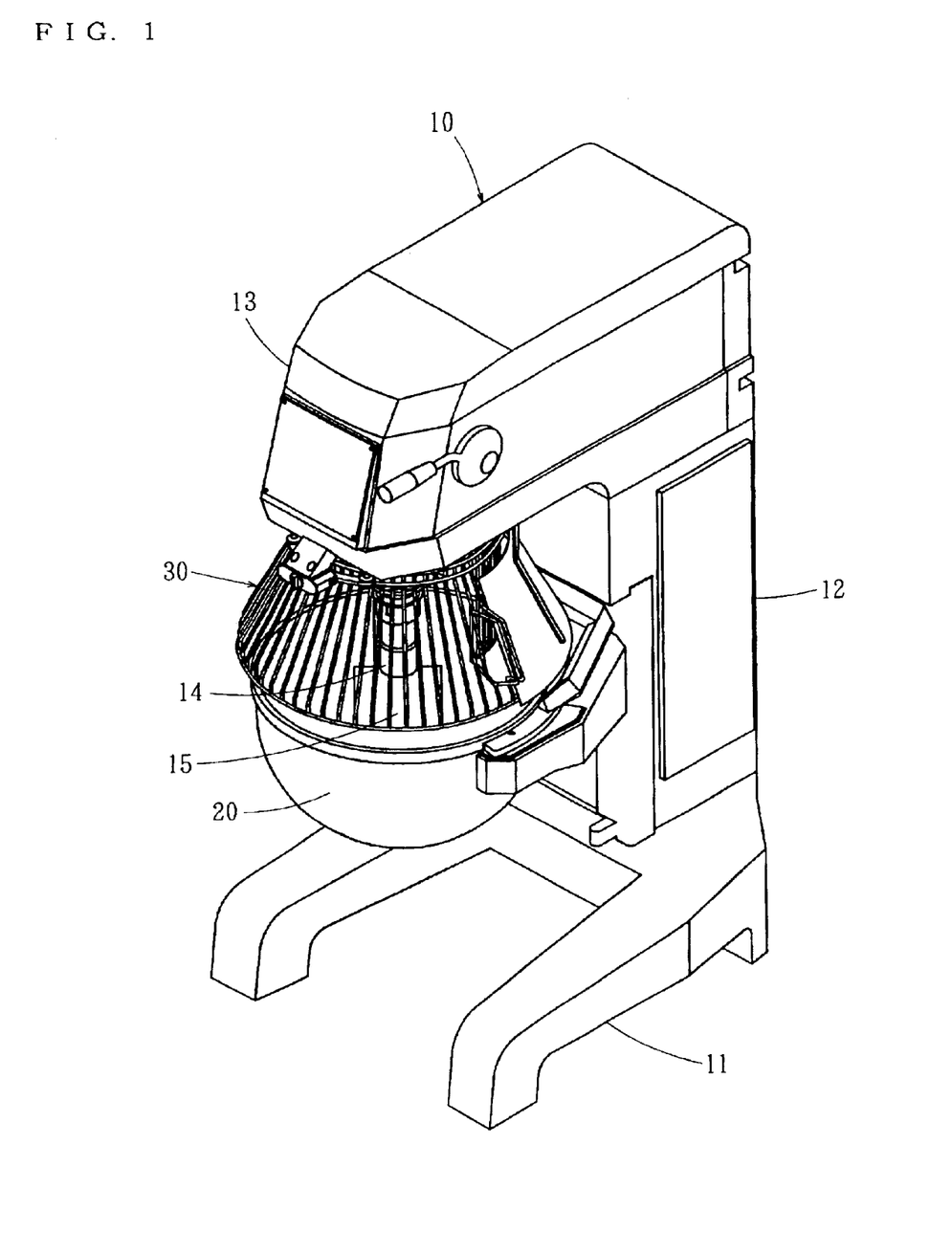
FIG. 1 is a perspective view of a mixer which is provided with the first embodiment of the partitioning device. The partitioning member is located to cover the upper part of the front of the bowl.

In the following, the embodiments of the partitioning device for mixer according to the present invention will be described with reference to the attached drawings. In FIG. 1 showing the first embodiment, 10 denotes the machine body of a mixer, and the machine body 10 comprises a stand 11, a pillar 12 rising from the rear end of the stand 11, and a head 13 protruding forward from the upper part of the pillar 12. The machine body 10 supports, on the front side of the pillar 12, a bowl 20, which opens upward. The mixer is provided with a bowl holder, which holds the bowl 20, and a lifting mechanism, which lifts and lowers the bowl holder. The lifting mechanism may be, for example, one which is operated through a panel to lift and lower the bowl holder by hydraulic power, electric power, etc. Or it may be one which is operated by a lever through a linkage to lift and lower the bowl holder. A mixing shaft 14 extends downward from the above-mentioned head 13, and a mixing tool 15 is attached to the bottom end of the mixing shaft 14. When the mixing shaft 14 is rotated by a motor which is housed in the machine body 10, the mixing tool 15 will rotate in the bowl to mix the materials in the bowl. In the case of this embodiment, the mixing shaft 14 rotates on its own axis while it moves around its revolution axis. However, the mixing shaft 14 may make either revolution or rotation.

Figure 3:
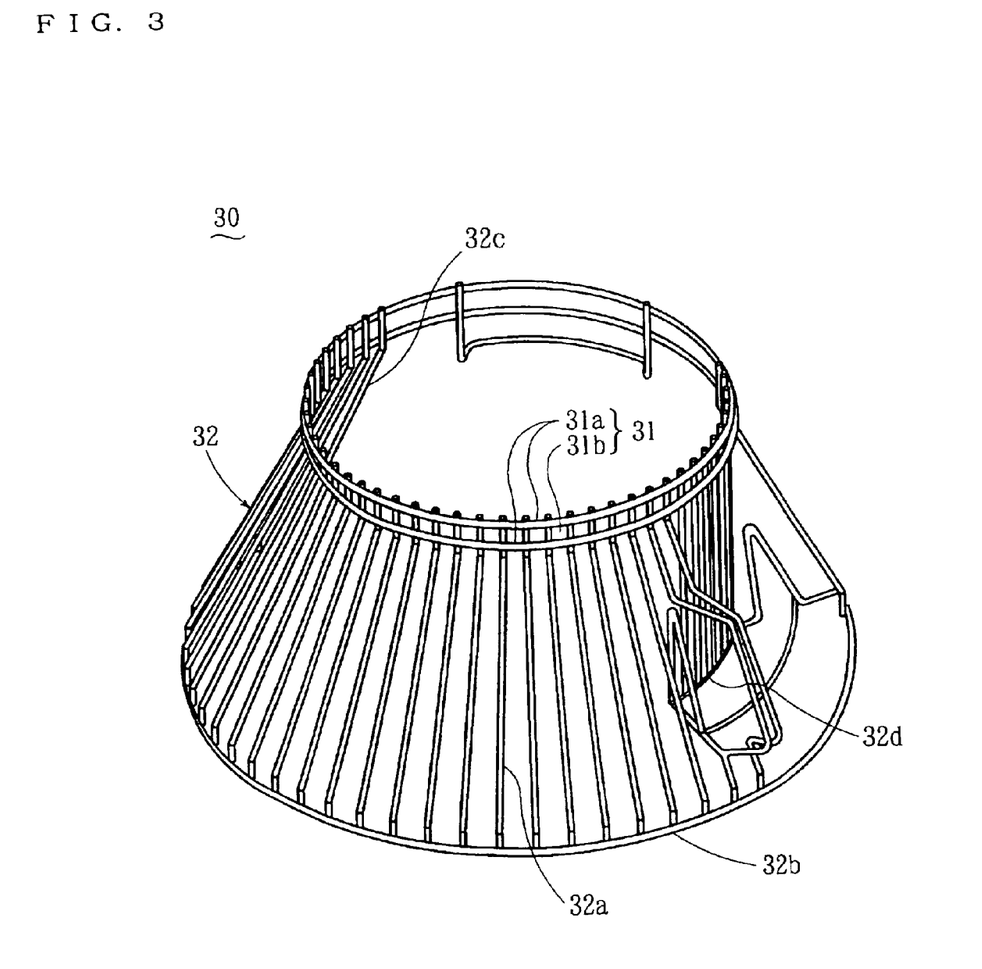
FIG. 3 is a perspective view showing the partitioning member of the partitioning device.

A partitioning member 30 as shown in FIG. 3 is provided between the head 13 and the bowl 20. The partitioning member 30 comprises an annular rail 31, which is arranged beneath the head 13 to surround the mixing shaft 14, and a surface member 32, which is formed into a tube having local openings and extends from the rail 31 toward the circumference of the bowl 20. A groove is formed on the inner circumference side or the outer circumference side of the rail 31 over the entire circumference. In the case of this embodiment, the rail 31 is formed by arranging two first annular members 31a with a vertical interval between them. Each first annular member 31a is formed by winding a rod material into a ring. A groove 31b is formed between these two first annular members 31a on the outer circumference side over the entire circumference. These first annular members 31a are fixed onto the surface member 32, which is arranged on the inner circumference side of the first annular members 31a, by welding or the like. The surface member 32 may be made of a plate piece or may be formed as a fence or a net. What is needed is that the surface member 32 can exhibit a function of preventing the hands of operators from entering. In the case of this embodiment, the surface member 32 comprises a fence 32a, which is formed by a large number of rods which are fixed at their top ends to the inner side of the first annular members 31a and extend downward aslant, and a second annular member 32b, which is formed by winding a rod material into a ring and connects the lower ends of the fence 32a. The surface member 32 has local openings. To be more precise, a portion is missing over about one half circumference of the tubular surface member 32 to form an opening 32c. Moreover, a portion of the surface member 32 is formed into a vertical face, and an opening 32d is formed on the outer circumference side of this vertical face. Either one of these openings may be provided.

Figure 2:
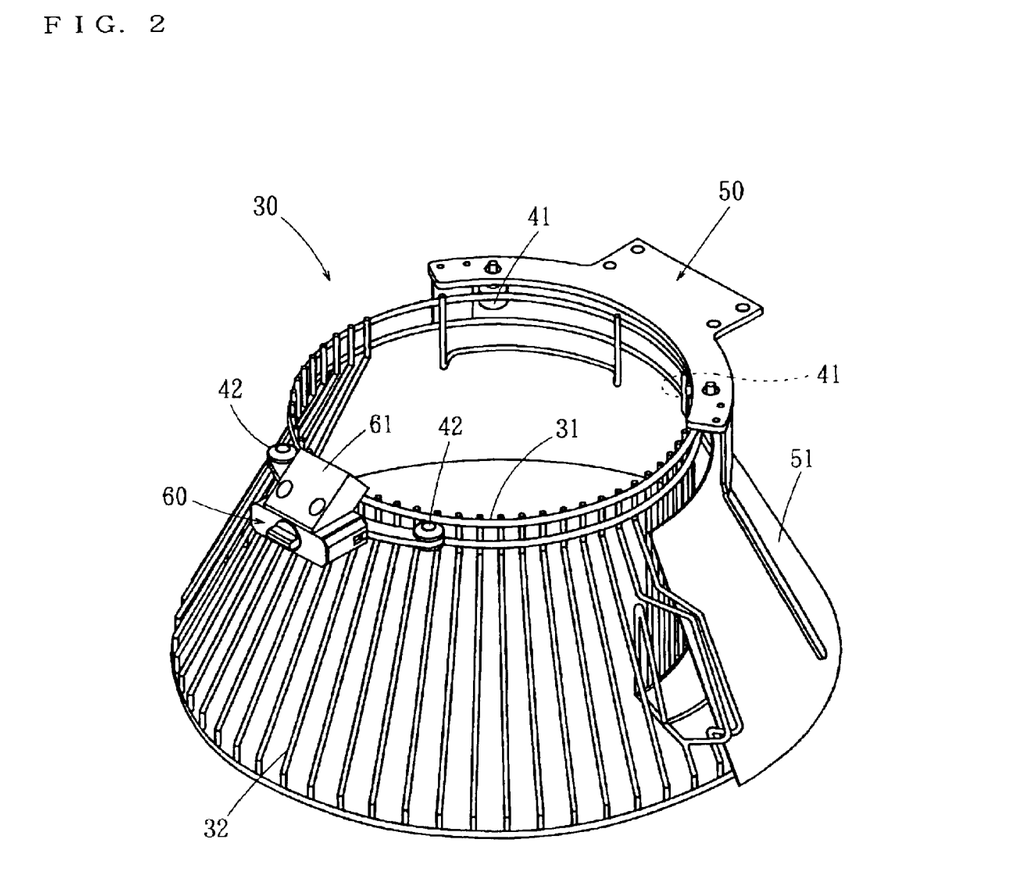
FIG. 2 is a perspective view which shows a partitioning member, fixed rollers, movable rollers, a fixed roller supporting means, a movable roller supporting means, etc. of the above-mentioned partitioning device. The partitioning member is located to cover the upper part of the front of the bowl.

As shown in FIG. 2, fixed rollers 41 and movable rollers 42 fit with the rail 31 of the partitioning member 30 on the inner side or the outer side thereof, and the partitioning member 30 is supported by these fixed rollers 41 and movable rollers 42. In the case of this embodiment, as the groove 31b is formed on the outer circumference side of the rail 31, the fixed rollers 41 and the movable rollers 42 fit into the groove 31b from the outer side. The fixed rollers 41 and the movable rollers 42 can rotate around axes which are parallel with the mixing shaft 14, and the partitioning member 30 is arranged to be moved around the mixing shaft 14 by the rotation of the fixed rollers 41 and the movable rollers 42 around these axes. At least a total of three rollers, in combination of the fixed roller(s) 41 and the movable roller(s) 42, are provided.

Figure 4:
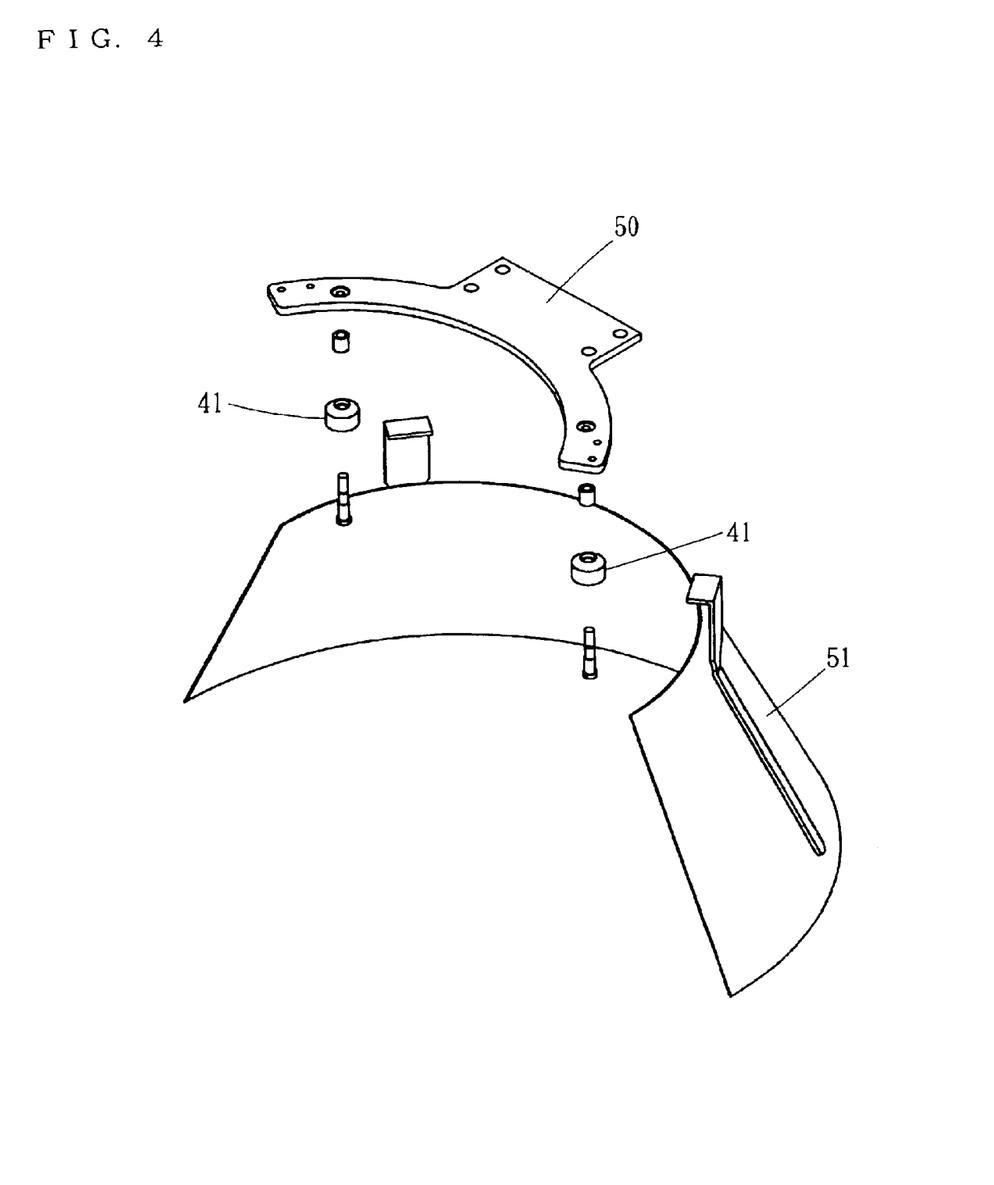
FIG. 4 is an exploded perspective view showing the fixed rollers, the fixed roller supporting means, a fixed cover, etc. of the partitioning device.

The machine body 10 is provided with a fixed roller supporting means 50, which supports the fixed roller 41 in such a way that the fixed roller 41 can rotate but does not make any shift in relation to the body 10. As shown in FIG. 4, in the case of this embodiment, the fixed roller supporting means 50 is a plate-shaped bracket. This fixed roller supporting means 50 is formed into a bow in plan view, and its intermediate part is fixed to the rear part of the lower face of the head 13, and its ends protrude forward aslant. A fixed roller 41 is rotatably provided on the lower side of each of these ends. The fixed roller supporting means 50 is provided, as occasion demands, with a fixed cover 51, which prevents materials from being scattered rearward or sideways. The fixed cover 51 is formed to be a tubular plate member of which front half is cut away, and the remaining portion covers the rear half of the space between the head 13 and the bowl 20. In the case of this embodiment, the partitioning member 30 and the fixed rollers 41 are provided on the inner circumference side of the fixed cover 51, but they may be provided on the outer circumference side of the fixed cover 51.

Figure 5:
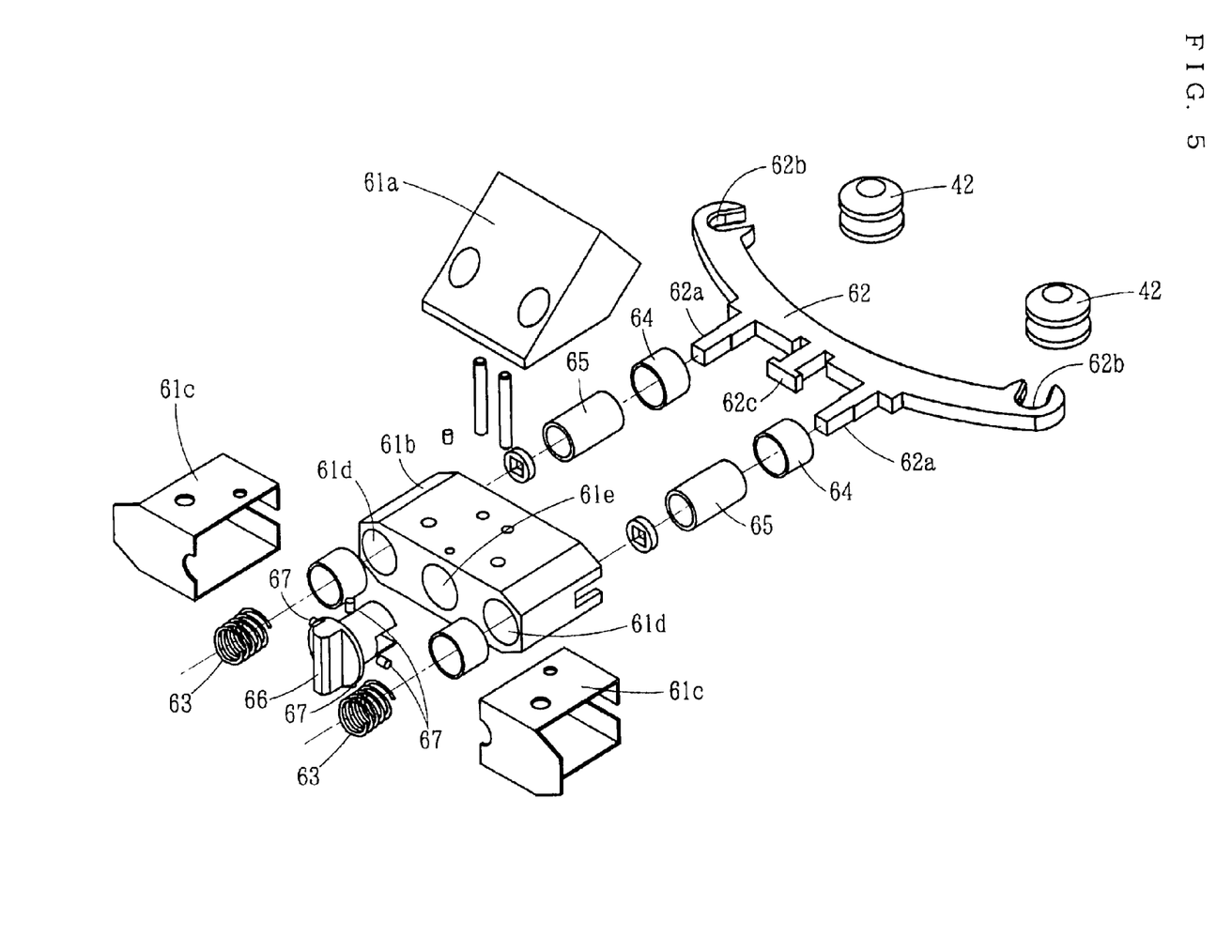
FIG. 5 is an exploded perspective view showing the movable rollers, the movable roller supporting means, etc. of the partitioning device.
Figure 6:
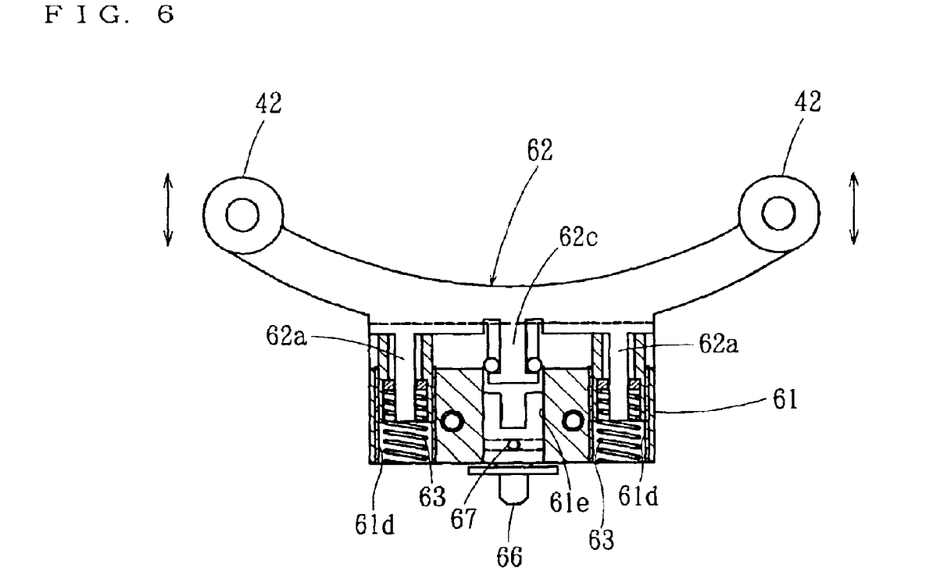
FIG. 6 is a plan view which partly sections the movable roller supporting means of the partitioning device to explain advancing and retracting functions of an arm.
Figure 7:
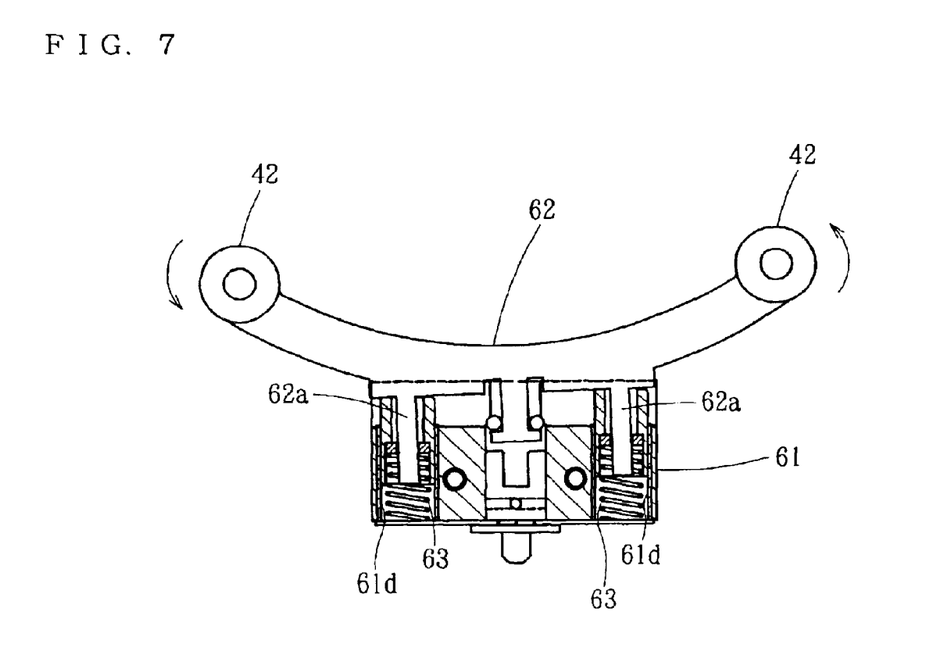
FIG. 7 is a plan view which partly sections the movable roller supporting means of the partitioning device to explain an oscillating function of the arm.

The machine body 10 is provided with a movable roller supporting means 60, which supports the movable roller 42 in such a way that the movable roller 42 can be rotated and the distance between the movable roller 42 and the fixed roller 41 can be varied and energizes the movable roller 42 in a direction to close to the fixed roller 41. As shown in FIG. 5, the movable roller supporting means 60 comprises a body 61, which is provided on the machine body 10, an arm 62, which is provided on the body 61 to rotatably support the movable roller 42 and to ensure that the distance between the movable roller 42 and the fixed roller 41 can be varied and the arm 62 can oscillate in plan view, and an elastic member 63, which is provided between the body 61 and the arm 62 to energize the arm 62 to close to the fixed roller 41. In the case of this embodiment, for the convenience in fabrication, assembly, etc., the body 61 is divided into three kinds of parts, namely, a first member 61a, which is fixed on the front side of the lower face of the head 13, a second member 61b, which is fixed on the bottom side of the first member 61a, and two third members 61c, which fit with both ends of the second member 61b. The arm 62 is formed into a bow in plan view, and two supporting bars 62a extend forward from its intermediate part in parallel to each other. In each of both ends of the arm 62, a U-shaped fitting hole 62b, which is narrowed at the entrance, is provided, and a constricted part of the intermediate part, in the height direction, of the movable roller 42 is rotatably fitted in each of the fitting holes 62b. As an alternative to this, the movable roller may be rotatably supported by a shaft which penetrates through it. Two through holes 61d are made in the second member 61b of the body 61 sidewise to penetrate the second member 61b in the front-rear direction, and the above-mentioned supporting bars 62a fit in the respective through holes 61d. With this arrangement, the distance between the arm 62 and the fixed rollers 41 can be varied (see FIG. 6). The internal dimension in the right-left direction of the through holes 61d is made a little larger than the right-left width of the supporting bars 62a, and with this arrangement, the arm 62 can oscillate in plan view (see FIG. 7). The front end of the through hole 61d is blocked by a third member 61c, and a coil spring 63 being an elastic member is squeezed and loaded in the space between this blocking face and the supporting bar 62a to energize the arm 62 to close to the fixed rollers 41. 64 and 65 denote sleeves which are inserted, as occasion demands, into the through holes 61d. 66 denotes a locking knob. The locking knob 66 rotatably fits, from the front, into a through hole 61e which is made in the second member 61b. A groove is made, in a radial direction, in the rear portion of the locking knob 66. On the other hand, a locking bar 62c extends forward from the intermediate part of the arm 62, and a crossbar, which can be loosely inserted into the groove of the above-mentioned locking knob 66, is formed on the top end of the locking bar 62c. When the locking knob 66 is in a release position, the crossbar of the locking bar 62c can fit loosely in the groove of the locking knob 66. Thus the arm 62 can move much in the forward direction. When the locking knob 66 is turned into the lock position, the crossbar of the locking bar 62c can contact the faces on both sides of the groove of the locking knob 66. Thus the forward movement of the arm 62 is limited to prevent the partitioning member 30 from being dropped inadvertently. 67 denotes magnets which are preferably provided on the locking knob 66. When the locking knob 66 comes to the above-mentioned release position or the lock position, these magnets will exhibit a function of tacking the knob 66 in the position by attracting a counterpart magnet in the body 61. The second member 61b is provided with two rod-shaped stoppers which vertically move in through holes 61e. The above-mentioned crossbar is located on the front side of these stoppers. Hence the arm 62 does not slip off the body 61 backward because the crossbar will contact the stoppers to halt (see FIG. 5 through FIG. 7). It should be noted that when a measure such as properly setting the elastic force of the elastic member according to application is taken, even if a force works on the partitioning member 30 to drop off, the arm can amply cope with the force and eliminate the possibility of the drop of the partitioning member 30. In such a case, there is no need of providing a drop prevention mechanism which uses the locking knob 66. The present invention includes embodiments wherein no drop prevention mechanism using the locking knob 66 or the like is provided.

Figure 8:
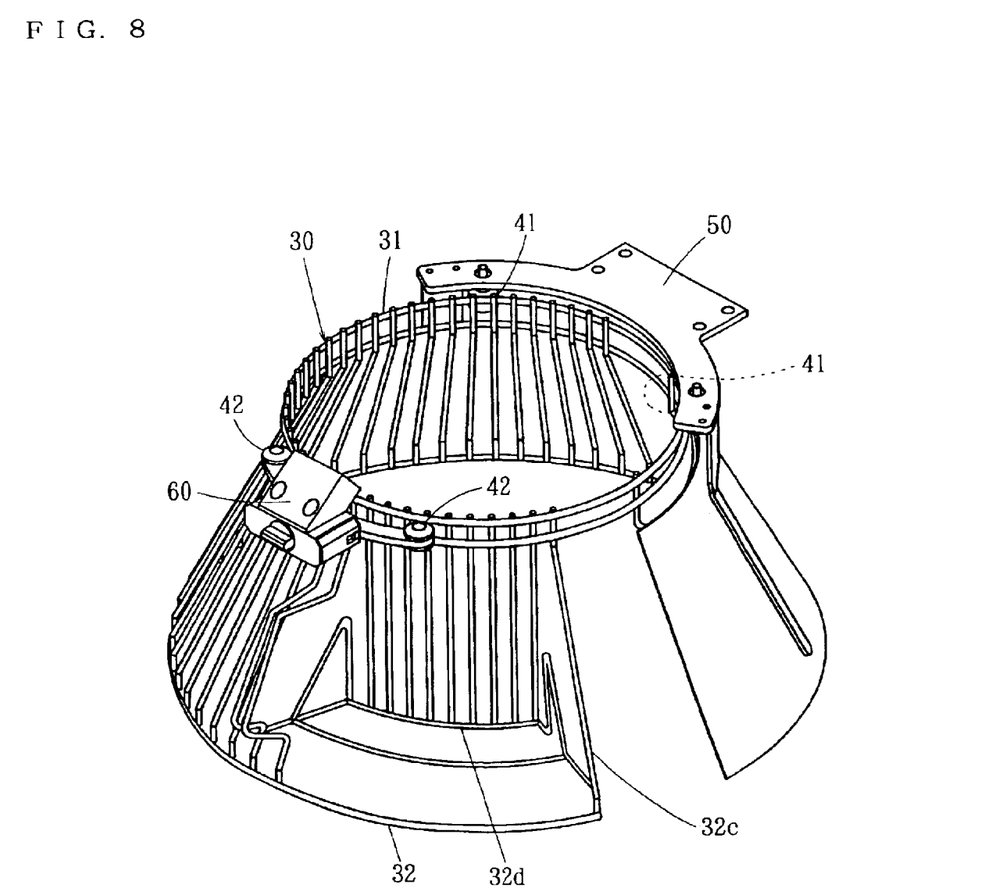
FIG. 8 is a perspective view which shows the partitioning member, the fixed rollers, the movable rollers, the fixed roller supporting means, the movable roller supporting means, etc. of the partitioning device. The partitioning member is located in such a way that its opening comes to the upper part of the front of the bowl.

Accordingly, in the case of the partitioning device for mixer of the first embodiment, the partitioning member 30 is moved when the fixed rollers 41 and the movable rollers 42 fitting with the rail 31 thereof are rotated. And, as shown in FIG. 1 and FIG. 2, when the partitioning member 30 is located to cover the upper part of the front of the bowl, hands of the operators will be prevented from entering into the rotation area of the mixing tool 15 and the materials are prevented from scattering. As shown in FIG. 8, when the partitioning member 30 is located in such a way that its openings 32c, 32d come to the upper part of the front of the bowl, the operators will be able to feed a material, visually check the material in the bowl 20 and fix or unfix the mixing tool 15.

Figure 9:
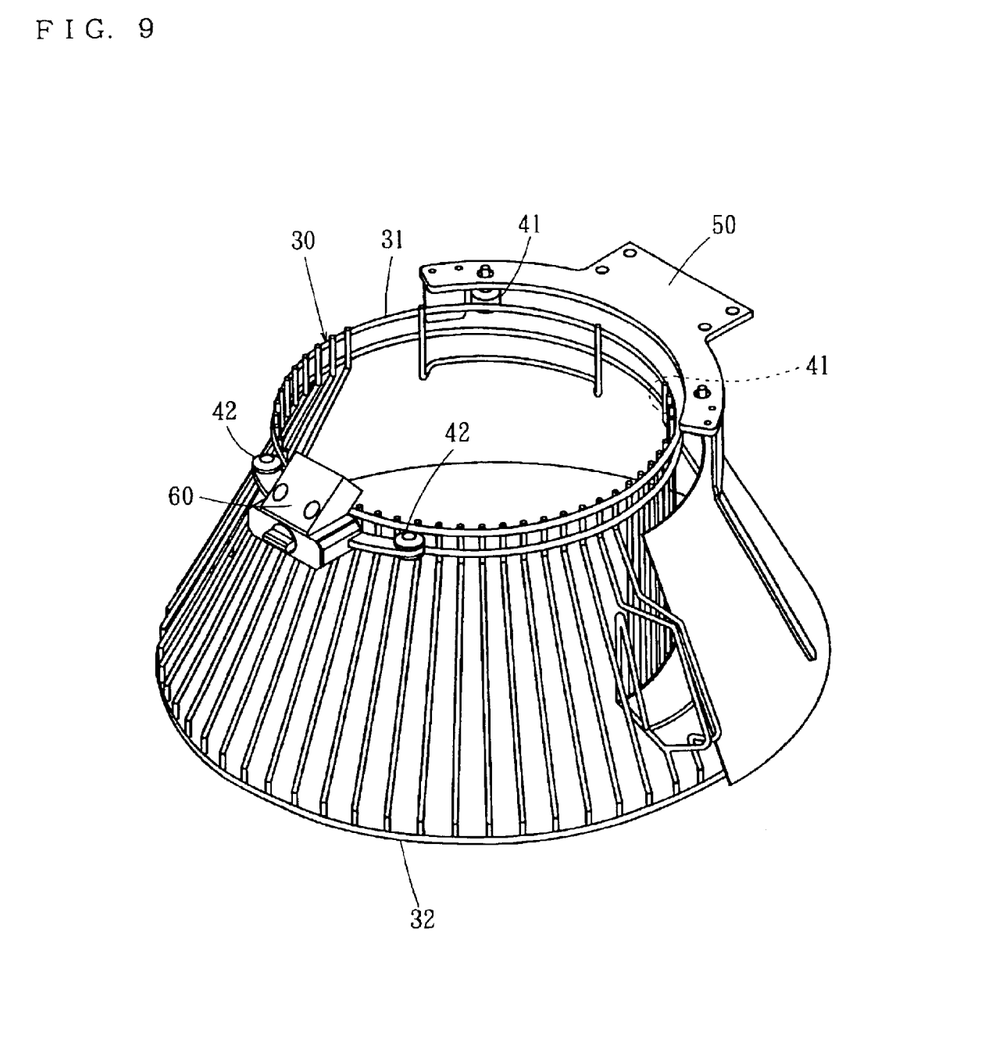
FIG. 9 is a perspective view of some parts, which shows that the movable rollers are being pressed by the partitioning member in a direction against their energizing forces.
Figure 10:
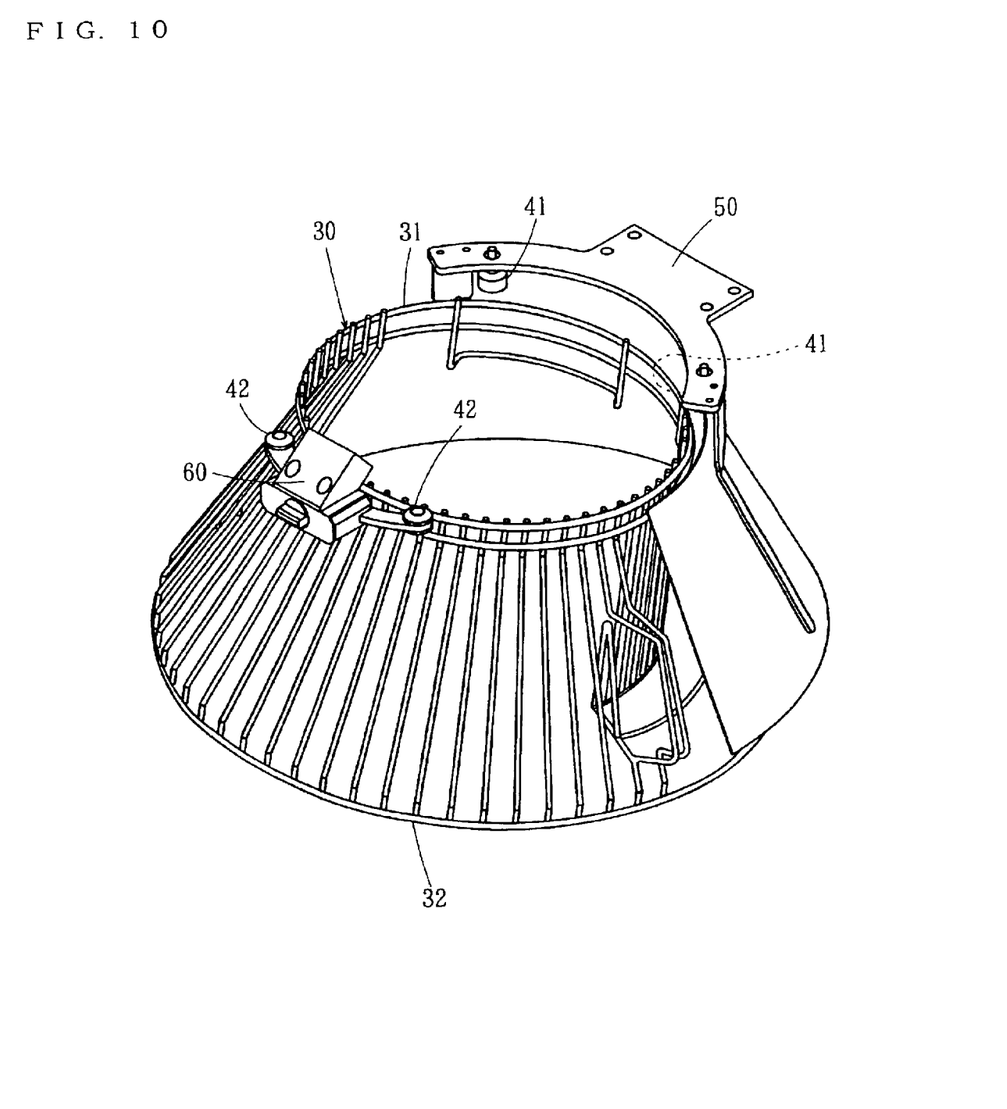
FIG. 10 is a perspective view of some parts, which shows that the partitioning member is being shifted downward aslant away from the fixed rollers.

When the partitioning member 30 is to be removed from the machine body 10, as shown in FIG. 9, the partitioning member 30 is held by hands and the movable rollers 42 are pressed in a direction against their energizing forces (forward in this embodiment). Then the rail 31 of the partitioning member 30 will come off the fixed rollers 41. As shown in FIG. 10, when the released rail portion is lowered and the partitioning member 30 is shifted downward aslant away from the fixed rollers 41, the partitioning member 30 will be released from the machine body 10. When the partitioning member 30 is to be fitted on the machine body 10, the above-mentioned procedure can be reversed. The partitioning member 30 is held by hands in such a way that the movable roller 42 side of the partitioning member 30 is raised a little higher than the other side, and the rail 31 of the partitioning member 30 is made to fit with the movable rollers 42 and the movable rollers 42 are pressed in a direction against their energizing forces. Then the partitioning member 30 is made level and it is allowed to move in the direction of the energizing forces of the movable rollers 42 and the rail 31 of the partitioning member 30 is made to fit with the fixed rollers 41. As a result, the partitioning member 30 is fitted on the machine body 10. The above-mentioned operation can be done easily by holding the partitioning member 30 with both hands. When the partitioning member 30 is removed from the machine body 10, the partitioning member 30 can be washed whole, and the interior of the machine body can be cleaned with ease, and the sanitary conditions of the mixer can be maintained satisfactorily.

As the movable rollers 42 are supported in such a way that the distance between the movable rollers 42 and the fixed rollers 41 can be varied and the movable rollers 42 are spring-biased or energized in a direction to close toward or move toward the fixed rollers 41, a plurality of different partitioning members 30, of which rails 31 have varied diameters, can be selectively supported between the fixed rollers 41 and the movable rollers 42, and in turn, the cost can be reduced through the use of common parts for various mixers. Moreover, even if the rail 31 of the partitioning member 30 is not a true circle, as the movable rollers 42 shift in such a way that the distance between the movable rollers 42 and the fixed rollers 41 varies, both the fixed rollers 41 and the movable rollers 42 always fit with the rail 31 stably, and the partitioning member 30 makes a smooth revolutionary movement.

The present invention includes all embodiments of the partitioning device wherein at least three rollers in total, in combination of the fixed roller and the movable roller, are provided. Of such embodiments, the partitioning device of the above-mentioned embodiment is provided with two fixed rollers 41 and two movable rollers 42. With this arrangement, all the rollers fit with a rail 31 of any curvature, and the partitioning member 30 is more stably supported than the case wherein a total of three rollers, in combination of the fixed roller 41 and the movable roller 42, are provided.

The present invention includes all embodiments of the partitioning device which is provided with a movable roller supporting means wherein the movable roller is supported in such a way that the movable roller can be rotated and the distance between the movable roller and the fixed roller can be varied, and the movable roller is biased or energized in a direction to close toward or move toward the fixed roller. Such embodiments include embodiments wherein the movable roller supporting means has a simple structure and comprises one supporting bar 62a, one through hole 61d and one coil spring 63. Among such embodiments, the partitioning device of the above-mentioned embodiment has a movable roller supporting means 60, which comprises a body 61, which is provided on the machine body 10, an arm 62, which is provided on the body 61 to rotatably support the movable rollers 42 and to ensure that the distance between the movable roller 42 and the fixed roller 41 can be varied and the movable roller 42 can oscillate in plan view, and an elastic member 63, which is provided between the body 61 and the arm 62 to bias or energize the arm 62 to close toward or move toward the fixed roller 41. With this arrangement, due to the oscillation of the arm 62, the movable roller 42 shifts to directions which cross the direction in which the movable roller 42 moves toward the fixed roller 41. Accordingly, not only when the partitioning member 30 rotates around the center of the rail 31 but also when the partitioning member 30 rotates while making a revolution little by little, the movable roller 42 satisfactorily follows the turning rail 31 to always fit with the rail 31 stably, and in turn, the partitioning member 30 rotates smoothly.

Figure 11:
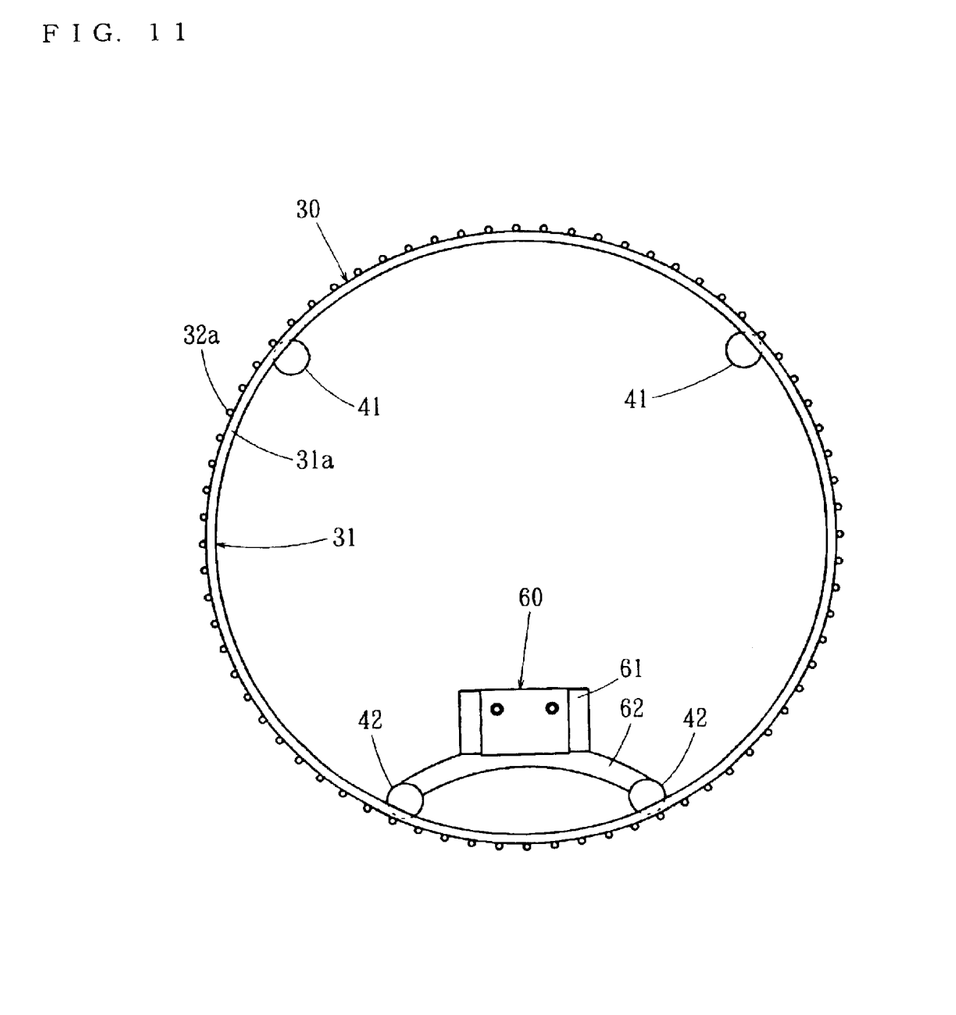
FIG. 11 is a plan view of some parts of the second embodiment of the partitioning device.

FIG. 11 shows some parts of the second embodiment of the partitioning device for mixer. The description of the above-mentioned first embodiment, including the reference characters, is reiterated in its entirety as the description of the second embodiment, and only configurations and effects which differ from those of the first embodiment will be described in the following. In the case of the first embodiment, the first annular members 31a are arranged with a vertical interval between them to form the rail 31. The groove 31b is formed between these two first annular members 31a on the outer circumference side over the entire circumference, and the fixed rollers 41 and the movable rollers 42 are fitted in this groove 31b. In the case of the second embodiment, the first annular members 31a are arranged with a vertical interval between them to form a rail 31, and a groove 31b is formed between these two first annular members 31a on the inner circumference side over the entire circumference. Then fixed rollers 41 and movable rollers 42 are fitted in this groove 31b. As a result, the fixed roller supporting means 50 and the movable roller supporting means 60 are located on the inner side of the rail 31 in plan view. The operation and the effects of the partitioning device for mixer of the second embodiment are the same as those of the first embodiment.

In the respective embodiments mentioned above, the fixed roller supporting means is provided separately from the machine body, but the fixed roller supporting means may be integrated with the machine body to make a part of the machine body function as the fixed roller supporting means. This also applies to the body of the movable roller supporting means. In the above-mentioned embodiments, the body is divided into three parts, but it may comprise one member, two members, or four or more members. The present invention is also applicable to mixers which are not provided with a lifting mechanism for the bowl.

With the description of these embodiments, the first partitioning device for mixer of the present invention, which was described in "Disclosure of Invention" above has been fully disclosed. Moreover, with the description of these embodiments, the second and third partitioning devices of mixer, which will be described below, have been fully explained.

The second partitioning device for mixer is the first partitioning device for mixer wherein two fixed rollers and two movable rollers are provided. With this arrangement, as all the rollers fit with a rail of any curvature, the rollers can function effectively. Moreover, the partitioning member is supported more stably than the case wherein a total of three rollers, in combination of the fixed roller and the movable roller, are provided.

The third partitioning device for mixer is the first partitioning device for mixer or the second partitioning device for mixer, wherein the movable roller supporting means comprises a body, which is provided on the machine body, an arm, which is provided on the body to rotatably support the movable roller and to ensure that the distance between the movable roller and the fixed roller can be varied and the arm can oscillate in plan view, and an elastic member, which is provided between the body and the arm to energize the arm to close to the fixed roller. With this arrangement, due to the oscillation of the arm, the movable roller shifts to directions which cross the direction in which the movable roller closes to the fixed roller. Accordingly, not only when the partitioning member rotates around the center of the rail but also when the partitioning member rotates while making a revolution little by little, the movable roller satisfactorily follows the turning rail to always fit with the rail stably, and in turn, the partitioning member rotates smoothly.

What is claimed is:

1. A partitioning device for mixer, which is provided on a mixer wherein a bowl is held on the front side of the pillar of the machine body, and a mixing tool is rotated in the bowl by a mixing shaft which extends downward from a head protruding forward from the upper part of the pillar, the partitioning device being characterized in that it comprises a partitioning member, which has an annular rail being arranged beneath the head to surround the mixing shaft and a surface member having a local opening and being formed into a tube to extend from the rail toward the circumference of the bowl, a total of at least three rollers being a combination of fixed roller and movable roller, which fit with the rail of the partitioning member from the inside or the outside to support the partitioning member movably around the mixing shaft, a fixed roller supporting means, which rotatably supports the fixed roller in such a way that the fixed roller is prevented from shifting in relation to the machine body, and a movable roller supporting means, which supports the movable roller in such a way that the movable roller can rotate and the distance between the movable roller and the fixed roller can be varied, and energizes the movable roller in a direction to close to the fixed roller.

2. A partitioning device for mixer as recited in claim 1, wherein two fixed rollers and two movable rollers are provided.

3. A partitioning device for a mixer as recited in claim 2, wherein the movable roller supporting means comprises a body, which is provided on the machine body, an arm, which is provided on the body to rotatably support the movable roller and to ensure that the distance between the movable roller and the fixed roller can be varied and the arm can oscillate in a plan view, and an elastic member, which is provided between the body and the arm to energize the arm to close to the fixed roller.

4. A partitioning device for a mixer as recited in claim 1, wherein the movable roller supporting means comprises a body, which is provided on the machine body, an arm, which is provided on the body to rotatably support the movable roller and to ensure that the distance between the movable roller and the fixed roller can be varied and the arm can oscillate in a plan view, and an elastic member, which is provided between the body and the arm to energize the arm to close to the fixed roller.

* * * * *